United States Patent
Lee

(10) Patent No.: US 8,736,781 B2
(45) Date of Patent: May 27, 2014

(54) LIQUID CRYSTAL DISPLAY DEVICE AND METHOD OF DRIVING THE SAME

(75) Inventor: Kyung-Eon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 343 days.

(21) Appl. No.: 12/819,563

(22) Filed: Jun. 21, 2010

(65) Prior Publication Data

US 2011/0032446 A1    Feb. 10, 2011

(30) Foreign Application Priority Data

Aug. 5, 2009    (KR) .................. 10-2009-0072056

(51) Int. Cl.
*G02F 1/1368*    (2006.01)

(52) U.S. Cl.
USPC ............................. 349/48; 349/144

(58) Field of Classification Search
None
See application file for complete search history.

(56) References Cited

U.S. PATENT DOCUMENTS

| | | | | |
|---|---|---|---|---|
| 6,104,450 | A * | 8/2000 | Hiraishi ........................ | 349/48 |
| 2003/0090448 | A1* | 5/2003 | Tsumura et al. ............... | 345/87 |
| 2005/0094077 | A1* | 5/2005 | Baek ............................ | 349/141 |
| 2007/0115234 | A1* | 5/2007 | Kim et al. .................... | 345/90 |
| 2010/0182522 | A1* | 7/2010 | Woo et al. ..................... | 349/37 |
| 2010/0208157 | A1* | 8/2010 | Kwon et al. ................... | 349/48 |
| 2010/0302471 | A1* | 12/2010 | Kim et al. ..................... | 349/37 |
| 2011/0285689 | A1 | 11/2011 | Kim et al. | |

FOREIGN PATENT DOCUMENTS

| | | |
|---|---|---|
| CN | 1971349 | 5/2007 |
| CN | 100354737 C | 12/2007 |
| CN | 101221337 | 7/2008 |
| KR | 10-2005-0038116 A | 4/2005 |
| KR | 10-2007-0054010 A | 5/2007 |
| KR | 10-2007-0117820 A | 12/2007 |
| TW | 2009-09960 A | 3/2009 |

OTHER PUBLICATIONS

Chinese Office Action dated Jan. 12, 2012 from corresponding application No. 201010206806.8.
TIPO—Office Action for Taiwanese Patent Application No. 099121580—Issued on Jan. 29, 2013—Including English Translation of Examination Statement.
KIPO—Office Action for Korean Patent Application No. 10-2009-0072056—Issued on Feb. 13, 2013.
Korean Office Action (Application No. 10-2009-0072056) dated Aug. 1, 2013.

* cited by examiner

*Primary Examiner* — Thanh-Nhan P Nguyen
(74) *Attorney, Agent, or Firm* — Morgan, Lewis & Bockius LLP

(57) ABSTRACT

A liquid crystal display device includes: a first gate line and a second gate line on a first substrate; a first data line and a second data line crossing the first and second gate lines to define a pixel region; a first thin film transistor connected to the first gate line and the first data line; a second thin film transistor connected to the first gate line and the second data line; a first pixel electrode in the pixel region and connected to the first thin film transistor; a second pixel electrode in the pixel region, connected to the second thin film transistor and including at least one opening therein; a common electrode on a second substrate; and a liquid crystal layer between the second pixel electrode and the common electrode.

10 Claims, 9 Drawing Sheets

LIQUID CRYSTAL DISPLAY DEVICE AND METHOD OF DRIVING THE SAME

The present invention claims the benefit of Korean Patent Application No. 10-2009-0072056, filed in Korea on Aug. 5, 2009, which is hereby incorporated by reference for all purposes as if fully set forth herein.

BACKGROUND OF THE INVENTION

1. Field of the Invention

The present invention relates to a liquid crystal display device, and more particularly, to a liquid crystal display device and a method of driving the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a perspective view illustrating an LCD device according to the related art.

Referring to FIG. 1, the LCD device includes an array substrate 10, a color filter substrate 20 and a liquid crystal layer 30. The array substrate 10 includes a gate line 14 and a data line 16 on a first substrate 12 that cross each other to define a pixel region P. A pixel electrode 18 and a thin film transistor Tr, as a switching element, are positioned in each pixel region P. The thin film transistors Tr, which are disposed adjacent to where the gate lines 14 and the data lines 16 cross, are disposed in a matrix form on the first substrate 12. The color filter substrate 20 includes a color filter layer 26 including red (R), green (G) and blue (B) color filter patterns 26a, 26b and 26c in respective pixel regions P on a second substrate 22, a black matrix 25 between the color filter patterns 26a to 26c, and a common electrode 28 on the color filter layer 26 and the black matrix 25.

Although not shown in the drawings, a sealant is formed along peripheral portions of the array substrate 10 and the color filter substrate 20 to attach the array substrate 10 and the color filter substrate 20 and prevents liquid crystal molecules of the liquid crystal layer 30 from leaking. Further, a lower alignment layer and an upper alignment layer are formed on inner surfaces on the array substrate 10 and the color filter substrate 20, respectively. Further, polarizing films may be formed on outer surfaces of the array substrate 10 and the color filter substrate 20. Further, a backlight supplying light is located below the array substrate 10.

Recently, the LCD device is equipped into electronic devices such as a personal digital assistant (PDA), laptop computer and mobile station. The electronic devices are much used in public places. Generally, users with the electronic devices need information displayed on the electronic devices not to be seen by others. According to the users' needs, an LCD device having two viewing angles, which are different, is proposed. This type LCD device may be referred to as a viewing angle image control (VIC) mode LCD device.

FIG. 2 is a plan view illustrating a VIC mode LCD device according to the related art, and FIG. 3 is a cross-sectional view taken along a line III-III. In FIG. 2, one image display unit includes four pixel regions P1 to P4 which are arranged adjacently into vertical and horizontal directions.

Referring to FIGS. 2 and 3, the LCD device 30 includes an array substrate, a color filter substrate facing the array substrate, and a liquid crystal layer 90 between the array substrate and the color filter substrate.

In the array substrate, gate and data lines 32 and 40 cross each other on a first substrate 31 to define the pixel regions P1 to P4. A thin film transistor Tr is located near the crossing portion of the gate and data lines 32 and 40, and connected to the gate and data lines 32 and 40. A common line 36 is spaced apart from and in parallel with the gate line 32.

The thin film transistor Tr includes a gate electrode 34, a semiconductor layer 39, and source and drain electrodes 42 and 43. A gate insulating layer 36 is on the gate electrode 34.

A plurality of first pixel electrodes 52 each having a bar shape are formed in each of the first to third pixel regions P1 to P3 and connected to the drain electrode 43 of the thin film transistor T through a drain contact hole 48 in a passivation layer 46. A plurality of first common electrodes 38 each having a bar shape are formed in each of the first to third pixel regions P1 to P3 and connected to the common line 36. The first pixel and common electrodes 52 and 38 are alternately arranged. In the fourth pixel region P4, a second pixel electrode 53 having a plate shape is formed and connected to the drain electrode 44 of the thin film transistor Tr.

In the color filter substrate, a color filter layer 76 and a black matrix 73 are formed on a second substrate 70. The color filter layer 76 includes a red (R) color filter pattern, a green (G) color filter pattern, and blue (B) color filter pattern 76c in the first to third pixel regions P1 to P3, respectively. In the fourth pixel region P4, separate color filter pattern is not deposited, and instead, a transparent overcoat layer 79 functions as a white (W) color filter pattern. The overcoat layer 79 is formed over the entire surface of the color filter substrate. A second common electrode 82 made of a transparent conductive material is formed in the fourth pixel region P4. The second common electrode 82 has a plate shape.

In the above-described LCD device 30, each of the first to third pixel regions P1 to P3 is operated according to an in-plane electric field induced between the first pixel and common electrodes 52 and 38. Accordingly, a wide viewing angle of the LCD device 31 can be obtained.

The fourth pixel region P4 is operated according to a vertical electric field induced between the second pixel and common electrodes 53 and 82. This causes a viewing angle of the LCD device 30 to be narrow. In other words, the fourth pixel region P4 is used to control the viewing angle of the LCD device 30 thus the viewing angle can become narrow.

In a case that the LCD device 30 displays texts usually seen in black and white, because of the operation of the fourth pixel region P4, the viewing angle of the LCD device 31 can be effectively controlled such that people around the LCD device 30 does not recognize information displayed on the LCD device 31.

However, in a case that the LCD device 31 displays images usually seen in various colors, since the fourth pixel region P4 does not have separate color filter pattern thus merely displays grays such as black and white, the viewing angle of the LCD device 30 cannot be effectively controlled.

Further, since the fourth pixel region P4 is used for a narrow viewing angle mode of the LCD device 30, when the LCD device 30 is required to be operated in a wide viewing angle mode, the fourth pixel region P4 is not operated thus displays black. Accordingly, brightness of the LCD device 30 is reduced.

SUMMARY OF THE INVENTION

Accordingly, the present invention is directed to a liquid crystal display device and a method of driving the same which substantially obviates one or more of the problems due to limitations and disadvantages of the related art.

An advantage of the present invention is to provide a liquid crystal display device and a method of driving the same that can improve viewing angle control and brightness.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device includes: a first gate line and a second gate line on a first substrate; a first data line and a second data line crossing the first and second gate lines to define a pixel region; a first thin film transistor connected to the first gate line and the first data line; a second thin film transistor connected to the first gate line and the second data line; a first pixel electrode in the pixel region and connected to the first thin film transistor; a second pixel electrode in the pixel region, connected to the second thin film transistor and including at least one opening therein; a common electrode on a second substrate; and a liquid crystal layer between the second pixel electrode and the common electrode.

In another aspect, a method of driving the liquid crystal display device includes: applying first and second pixel voltages to the first and second pixel electrodes, respectively, and applying a common voltage between the first and second pixel voltages to the common electrode, thereby operating the liquid crystal display device in a wide viewing angle mode.

In yet another aspect, a method of driving the liquid crystal display device includes: applying the first and second pixel voltages, a difference of which is about 0V to about 0.5V, to the first and second pixel electrodes, respectively, and applying a common voltage to the common electrode, thereby operating the liquid crystal display device in a narrow viewing angle mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
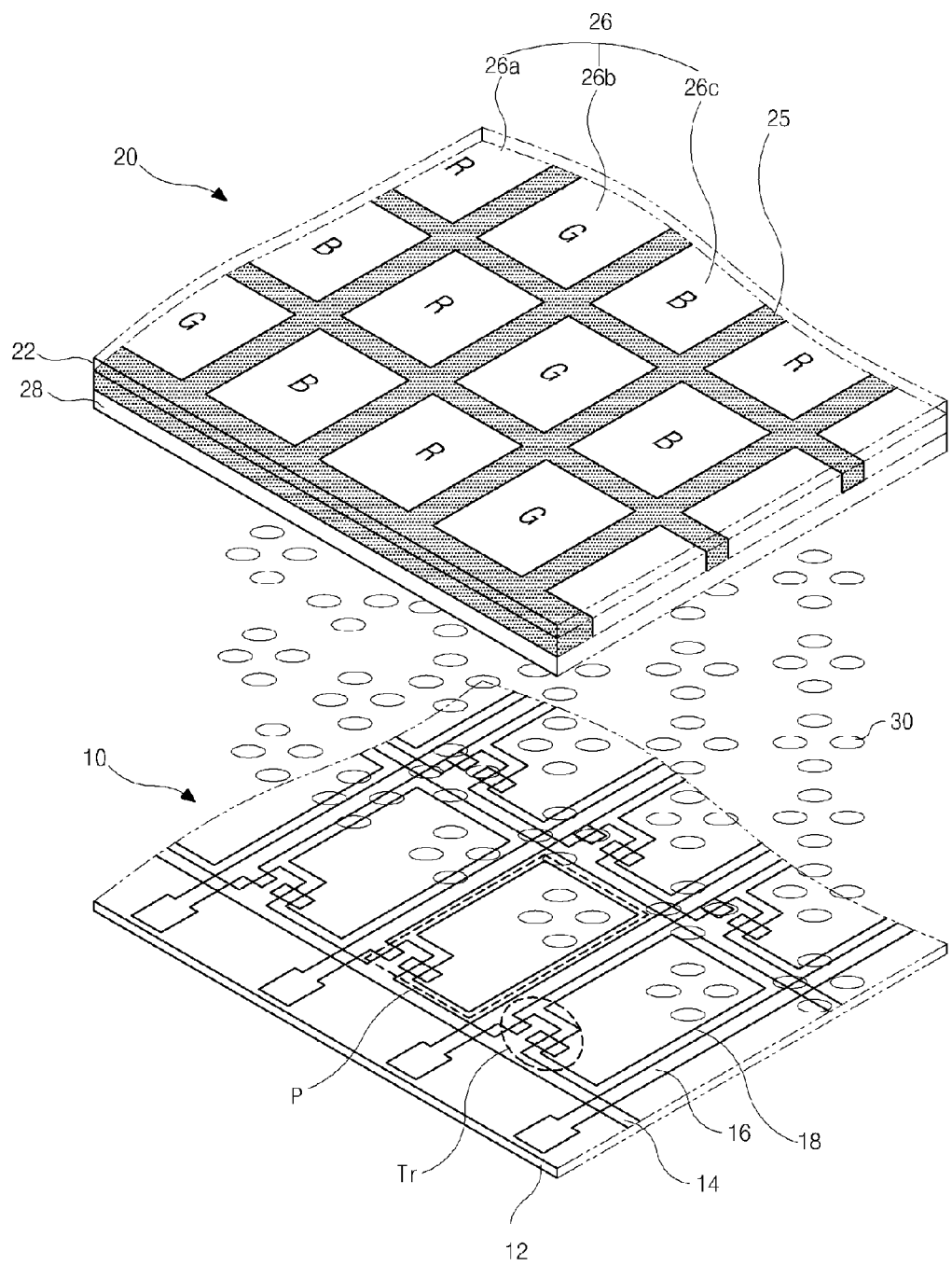
FIG. 1 is a perspective view illustrating an LCD device according to the related art.
Figure 2:
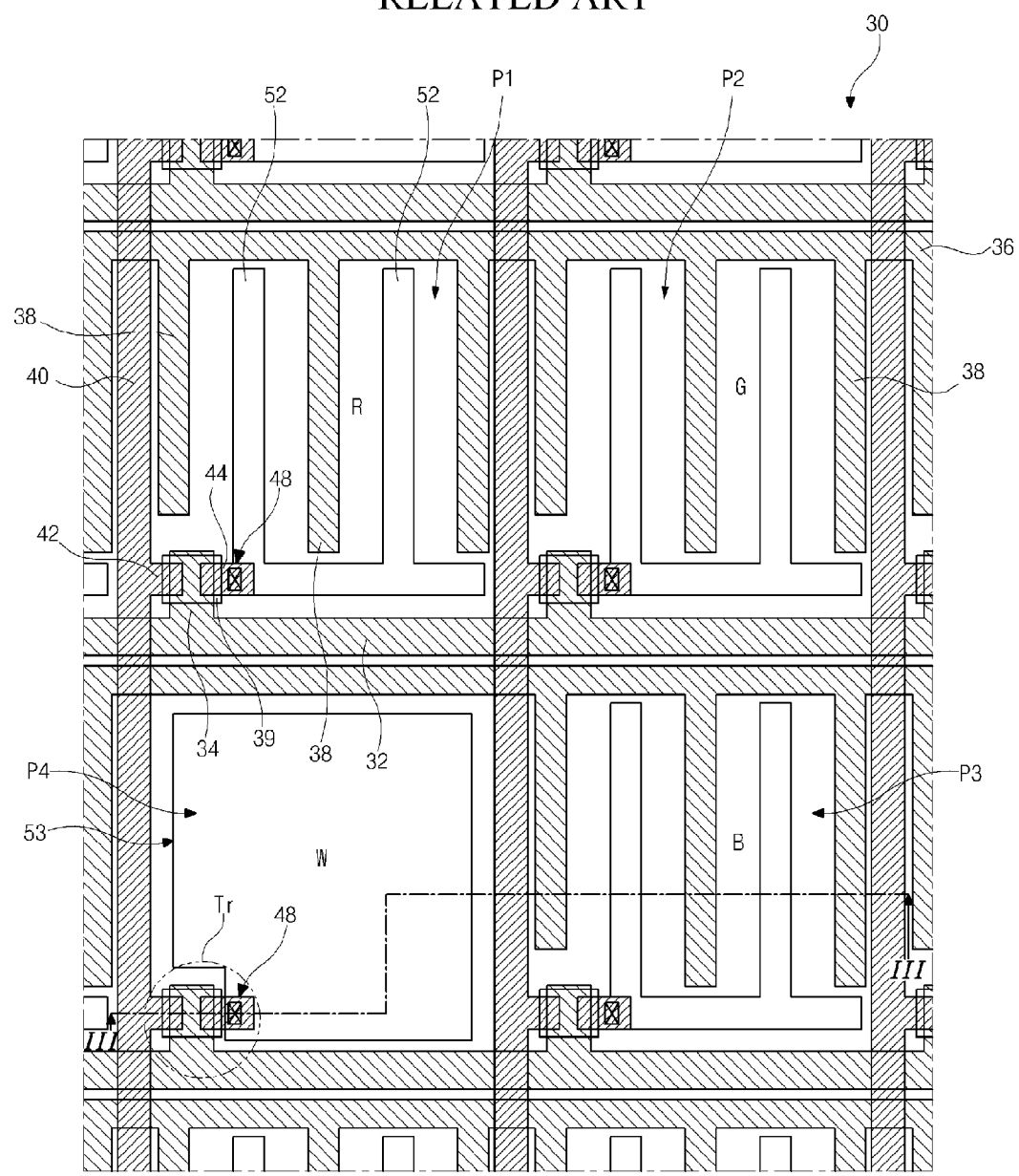
FIG. 2 is a plan view illustrating a VIC mode LCD device according to the related art.
Figure 3:
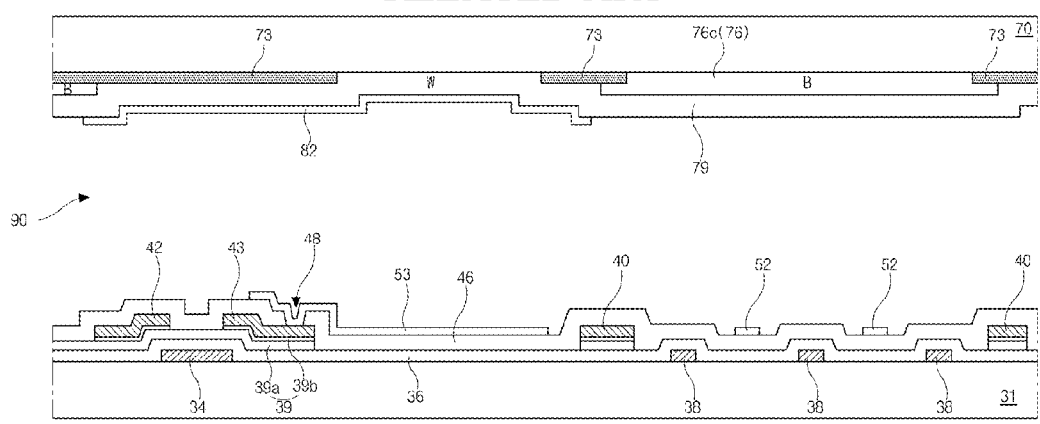
FIG. 3 is a cross-sectional view taken along a line III-III.
Figure 4:
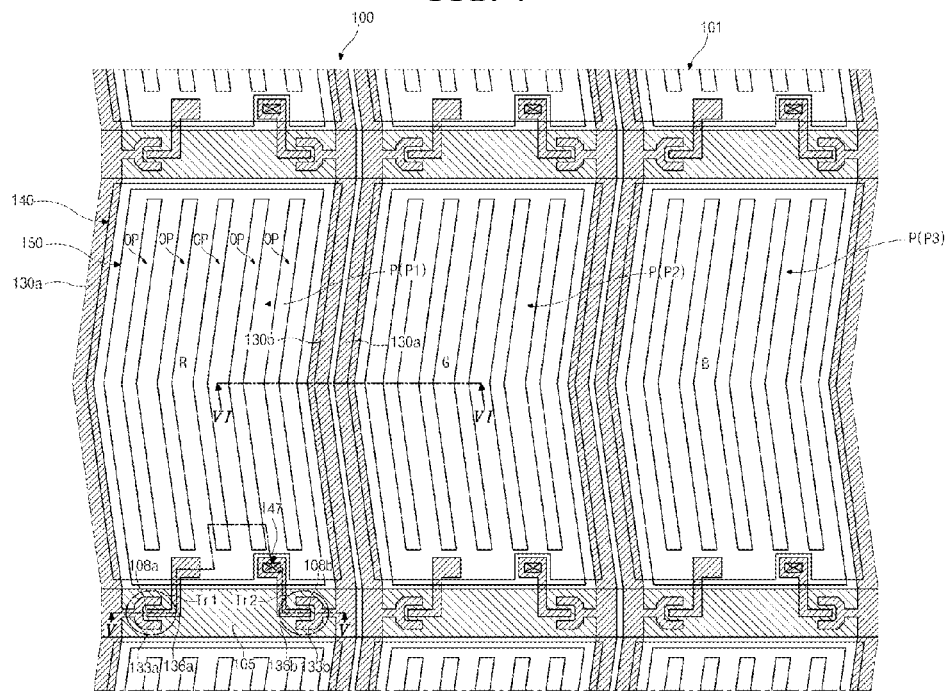
FIG. 4 is a plan view illustrating an VIC mode LCD device according to an embodiment of the present invention.
Figure 5:
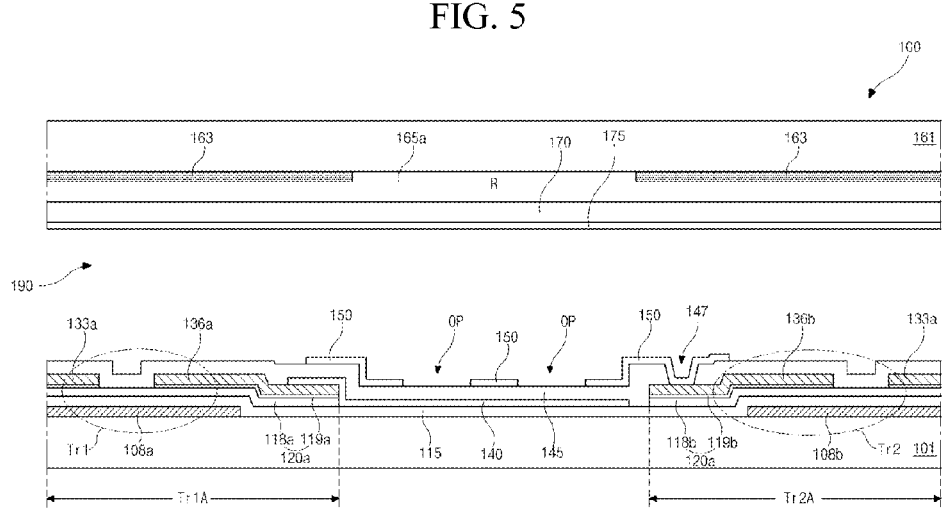
FIGS. 5 and 6 are cross-sectional views taken along lines V-V and VI-VI of FIG. 4, respectively.
Figure 6:
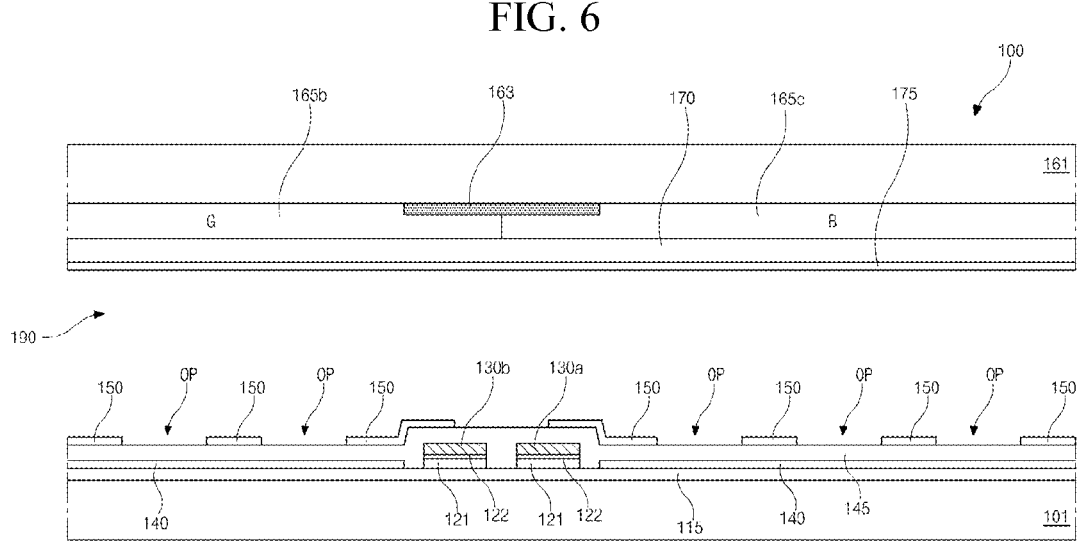

FIG. 4 is a plan view illustrating an VIC mode LCD device according to an embodiment of the present invention, and FIGS. 5 and 6 are cross-sectional views taken along lines V-V and VI-VI of FIG. 4, respectively.

Referring to FIGS. 4 to 6, the LCD device 100 includes an array substrate, a color filter substrate, and a liquid crystal layer 190 between the array substrate and the color filter substrate.

In the array substrate, a gate line 105 is formed on a first substrate 101 along a first direction. First and second data lines 130a and 130b are formed along a second direction and cross the gate line 105 to define a pixel region P. A common line spaced apart from and parallel with the gate line 105 may be formed. The common line may be formed at the same process of forming the gate line 105 and overlap a first pixel electrode 140 to form a storage capacitor.

In the pixel region P, first and second thin film transistors Tr1 and Tr2 are formed. The first thin film transistor Tr1 is formed corresponding to a first switching region Tr1A and connected to the gate line 105 and the first data line 130a. The first thin film transistor Tr1 includes a first gate electrode 108a, a first semiconductor layer 120a, a first source electrode 133a and a first drain electrode 136a. The first semiconductor layer 120a includes a first active layer 118a and a first ohmic contact layer 119a. The first active layer 118a may be made of intrinsic amorphous silicon, and the first ohmic contact layer 119a may be made of extrinsic amorphous silicon.

The second thin film transistor Tr2 is formed corresponding to a second switching region Tr2A and connected to the gate line 105 and the second data line 130b. The second thin film transistor Tr2 includes a second gate electrode 108b, a second semiconductor layer 120b, a second source electrode 133b and a second drain electrode 136b. The second semiconductor layer 120b includes a second active layer 118b and a second ohmic contact layer 119b. The second active layer 118b may be made of intrinsic amorphous silicon, and the second ohmic contact layer 119b may be made of extrinsic amorphous silicon.

Each of the first and second source electrodes 118a and 118b and a channel portion of each of the first and second thin film transistors Tr1 and Tr2 may have an "U" shape but is not limited thereto.

Further, each of the first and second gate electrodes 108a and 108b may be a portion of the gate line 105 but is not limited thereto.

In the pixel region P, the first pixel electrode 140 connected to the first drain electrode 136a is formed. The first pixel electrode 140 may have a plate shape. Alternatively, the first pixel electrode 140 may have at least one opening therein. A second pixel electrode 150 is formed on the first pixel electrode 140 with at least one insulating layer therebetween, for example, a passivation layer 145. The second pixel electrode 150 may have at least one opening OP therein. The second pixel electrode 150 is connected to the second drain electrode 136b through a drain contact hole 147 in the passivation layer 145.

Figure 12:
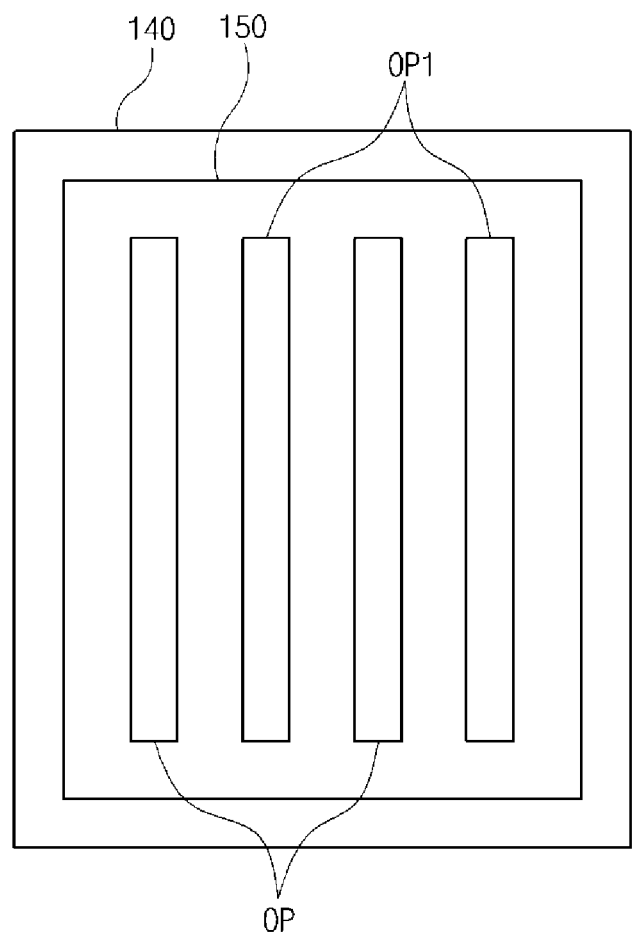
FIG. 12 is a schematic view illustrating another VIC mode LCD device according to the embodiment of the present invention.

With reference to FIG. 12, in a case that the first pixel electrode 140 has the opening OP1, the opening OP1 of the first pixel electrode 140 may not overlap the opening OP of the second pixel electrode 150. Rather, it is preferred that the opening OP1 of the first pixel electrode 140 and the opening OP of the second pixel electrode 150 are alternately arranged.

It is preferred that the opening OP is bent at least one portion. For example, the opening OP is bent and symmetrical with respect to a virtual line which is substantially at a center of the pixel region and parallel with the gate line 105. According to the configuration of the opening OP, symmetrical domains with respect to the bent portion of the opening OP are produced. By producing the symmetrical domains, a color inversion problem occurring at a specific viewing angle when the LCD device 100 is operated in a wide viewing angle mode can be reduced. In similar to the opening OP, the first and second data lines 130a and 130b may have a bent shape.

Alternatively, the opening OP may have a straight shape, and the first and second data lines 130a and 130b also have a straight shape.

In the embodiment, one image display unit may include three pixel regions P1 to P3 which are arranged adjacently and display red (R), green (G) and blue (B), respectively. The first to third pixel regions P1 to P3 have substantially the same configuration. As such, the LCD device 100 of the embodiment does not additionally need the fourth pixel of the related art VIC mode LCD device.

In the color filter substrate, a color filter layer is formed on a second substrate 161 and includes a red (R) color filter pattern 165a, a green (G) color filter pattern 165b and a blue (B) color filter pattern 165c corresponding to the first to third pixel regions P1 to P3, respectively. A common electrode 175 is formed substantially over the entire surface of the color filter substrate. As such, all pixel regions P of the LCD device 100 have respective color filter patterns and the common electrode 175 in different from the related art.

In the above explanations, described is the LCD device 100 using one gate line 105 and two data lines 130a and 130b to operate the pixel regions P along each column line. The pixel region P includes two thin film transistors Tr1 and Tr2 connected to two pixel electrodes 140 and 150, respectively, thus the pixel electrodes 140 and 150 are applied to the respective voltages.

Figure 11:
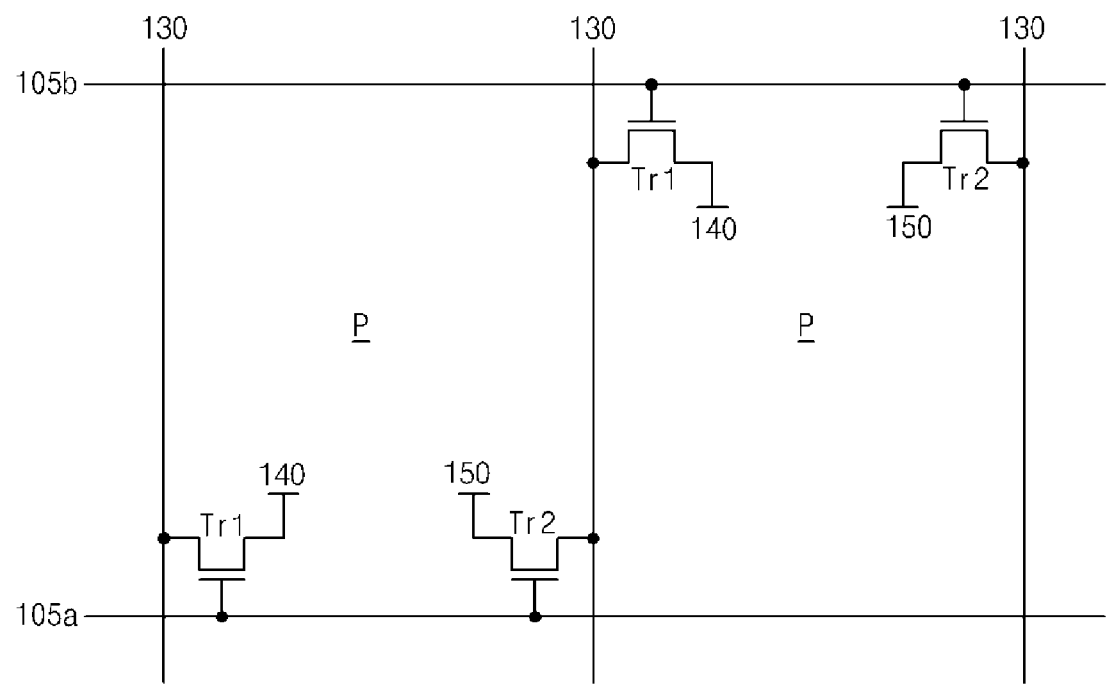
FIG. 11 is a schematic view illustrating another VIC mode LCD device according to the embodiment of the present invention.

Alternatively, another type LCD device may be proposed. FIG. 11 is a schematic view illustrating another VIC mode LCD device according to the embodiment of the present invention. For example, with reference to FIG. 11, two gate lines i.e., first and second gate lines 105a and 105b are arranged along each row line, each pixel region P along each row line is connected to adjacent two data lines 130, and adjacent pixel regions P along each row line shares a data line 130 therebetween. Further, the pixel regions P along each row line are alternately connected to the first and second gate lines 105a and 105b. For example, among pixel regions P on each row line, pixel regions P on odd column lines are connected to the first gate line 105a, and pixel regions P on even column lines are connected to the second gate line 105b. Accordingly, two thin film transistors Tr1 and Tr2 of the pixel region P on the odd column line are connected to the first gate line 105a while two thin film transistors Tr1 and Tr2 of the pixel region P on the even column line are connected to the second gate line 105b. Further, one of the two thin film transistors, for example, the first and second transistors Tr1 and Tr2 of the pixel region P on the odd column line, and the other one of the first and second transistors Tr1 and Tr2 of the pixel region P on the even column line shares a data line 130 between the two pixel regions P on the odd and even lines. Accordingly, the another type LCD device have about twice the gate lines of the LCD device of FIG. 4, and have about half the data lines of the LCD device of FIG. 4.

Referring back to FIGS. 4 to 6, the gate line 105 and the first and second gate electrodes 108a and 108b may be made of a metal material, for example, aluminum (Al), aluminum alloy (e.g., AlNd), copper (Cu), copper alloy, chromium (Cr), or molybdenum (Mo). The first and second gate electrodes 108a and 108b are formed in the first and second switching regions TrA1 and TrA2, respectively.

A gate insulating layer 115 is formed on the gate line 105 and the first and second gate electrodes 108a and 108b. The gate insulating layer 115 may be made of an inorganic insulating material, for example, silicon oxide ($SiO_2$) or silicon nitride ($SiNx$).

The first semiconductor layer 120a is formed on the gate insulating layer 115 and corresponds to the first gate electrode 108a. The second semiconductor layer 120b is formed on the gate insulating layer 115 and corresponds to the second gate electrode 108b.

The first source and drain electrodes 133a and 136a are formed on the first semiconductor layer 120a and spaced apart from each other. The second source and drain electrodes 133b and 136b are formed on the second semiconductor layer 120b and spaced apart from each other.

The first active layer 118a is exposed between the first source and drain electrodes 133a and 136a. The second active layer 118b is exposed between the second source and drain electrodes 133b and 136b.

The first and second data lines 130a and 130b are formed on the gate insulating layer 115 and connected to the first and second source electrodes 133a and 133b, respectively. First and second semiconductor patterns 121 and 122 may be formed between each of the first and second data lines 130a and 130b and the gate insulating layer 115. The first semiconductor pattern 121 may be made of the same material as the active layers 118a and 118b, and the second semiconductor pattern 122 may be made of the same material as the ohmic contact layers 119a and 119b.

The first pixel electrode 140 may be formed on the gate insulating layer 115, contact the first drain electrode 136a, and be made of a transparent conductive material, for example, indium-tin-oxide (ITO), indium-zinc-oxide (IZO), or indium-tin-zinc-oxide (ITZO).

The passivation layer 145 is formed on the first electrode 140. The passivation layer 145 may be formed of an inorganic insulating material, for example, silicon oxide ($SiO_2$) or silicon nitride (SiNx), or an organic insulating material, for example, benzocyclobutene (BCB) or photo acrylic. The passivation layer 145 has the drain contact hole 147 exposing the second drain electrode 136b.

The second pixel electrode 150 is formed on the passivation layer 145. The second pixel electrode 150 may be made of a transparent conductive material, for example, indium-tin-oxide (ITO), indium-zinc-oxide (IZO), or indium-tin-zinc-oxide (ITZO). Overlapping portions of the first and second pixel electrodes 140 and 150 may form a storage capacitor with the passivation layer 145 therebetween. Further, in a case that the common line is formed to overlap the first pixel electrode 140, overlapping portions of the common line and the first pixel electrode 140 may form another storage capacitor with the gate insulating layer 115 therebetween.

A black matrix 163 is formed on the second substrate 161. The black matrix 163 may correspond to and shield at least one of the gate line 105, the first and second data lines 130a and 130b and the first and second thin film transistors Tr1 and Tr2.

The red (R), green (G) and blue (B) color filter patterns 165a, 165b and 165c are formed on the black matrix 163 and correspond to the first to third pixel regions P1 to P3.

An overcoat layer 170 is formed on the color filter patterns 165a, 165b and 165c. The overcoat layer 170 may be made of a transparent organic insulating material. The common electrode 175 is formed on the overcoat layer 170.

The LCD device of the embodiment can be selectively driven in a wide viewing angle mode or narrow viewing angle mode. A method of driving the LCD device 100 is explained further with reference to FIGS. 7 to 10.

Figure 7:
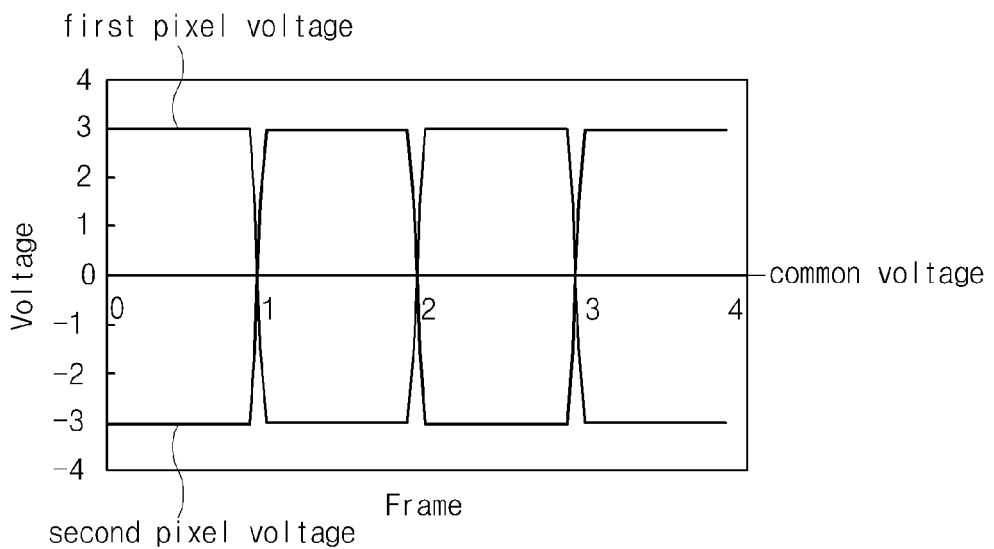
FIG. 7 is a view illustrating voltages applied to the first and second pixel electrodes and the common electrode of the LCD device in a wide viewing angle mode according to the embodiment of the present invention.
Figure 8:
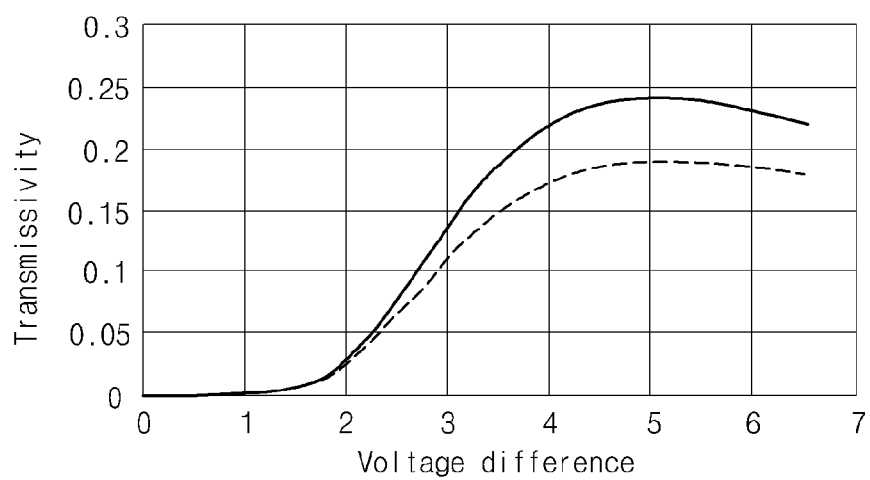
FIG. 8 shows T (transmissivity)-V (voltage) curves of the LCD devices in a wide viewing angle modes of the embodiment according to the present invention and the related art.
Figure 9:
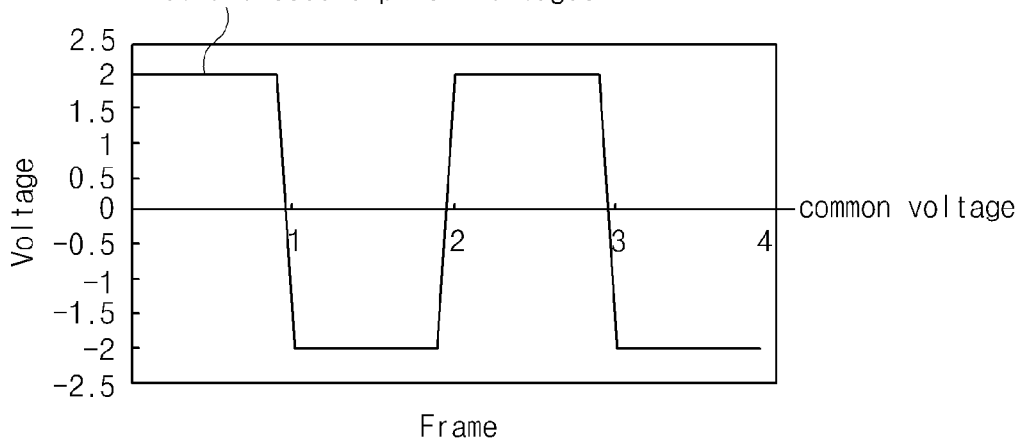
FIG. 9 is a view illustrating voltages applied to the first and second pixel electrodes and the common electrode of the LCD device in a narrow viewing angle mode according to the embodiment of the present invention.
Figure 10:
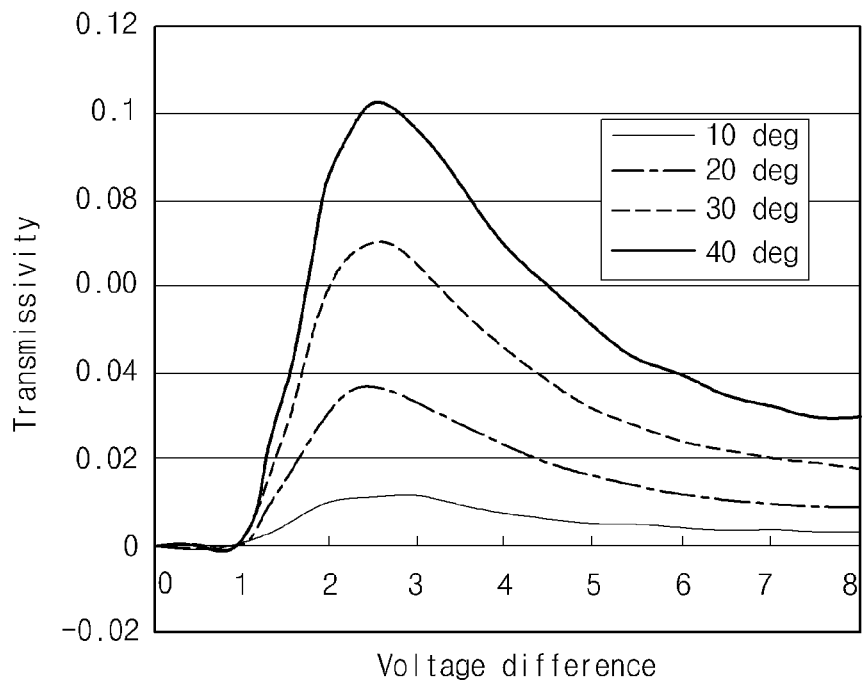
FIG. 10 shows curves of transmissivity to polar angle of the LCD device in a narrow viewing angle mode according to the embodiment of the present invention.

FIG. 7 is a view illustrating voltages applied to the first and second pixel electrodes and the common electrode of the LCD device in a wide viewing angle mode according to the embodiment of the present invention, FIG. 8 shows T (transmissivity)-V (voltage) curves of the LCD devices in a wide viewing angle modes of the embodiment according to the present invention and the related art, FIG. 9 is a view illustrating voltages applied to the first and second pixel electrodes and the common electrode of the LCD device in a narrow viewing angle mode according to the embodiment of the present invention, and FIG. 10 shows curves of transmissivity to polar angle of the LCD device in a narrow viewing angle mode according to the embodiment of the present invention.

A wide viewing angle mode of the LCD device 100 is performed by operating liquid crystal molecules of the liquid crystal layer 190 according to voltage difference between the first and second pixel electrodes 140 and 150. In other words, gray levels of the pixel region P change according to electric fields between the first and second pixel electrodes 140 and 150.

Referring to FIG. 7, in the wide viewing angle mode, a common voltage applied to the common electrode 175 has a value between a data voltage i.e., a first pixel voltage applied to the first pixel electrode 140 and a data voltage i.e., a second pixel voltage applied to the second pixel electrode 150. It is preferred that the common voltage is substantially middle between the first and second pixel voltages.

The first and second pixel voltages are opposite in polarity with respect to the common voltage. For example, when the first pixel voltage has a positive polarity, the second pixel voltage has a negative polarity. Further, each of the first and second pixel voltages may periodically change in polarity. For example, each of the first and second pixel voltages alternates between positive and negative polarities per frame.

By applying the first and second pixel voltages, which are opposite and each alternate in polarity, to the first and second pixel electrodes 140 and 150, respectively, an electric field between the first and second pixel electrodes 140 and 150 periodically switches in direction. Accordingly, prevented can be a problem that the liquid crystal molecules are fixed in a specific direction due to an electric field not changing in direction thus residual image is produced.

Further, the electric field induced between the first and second pixel electrodes 140 and 150 is substantially parallel with a plane of the first substrate 101. Such the electric field may be referred to as an in-plane electric field. Accordingly, the liquid crystal molecules are operated by the in-plane electric field, thus a wide viewing angle of the LCD device 100 can be obtained.

Further, the LCD device 100 does not need the white pixel region of the related art which is used to control a viewing angle and becomes black in the wide viewing angle mode. Accordingly, even when the LCD device 100 is operated in the wide viewing angle mode, brightness reduction can be prevented. Therefore, compared to the related art, brightness can increase.

A reference "voltage difference" in FIG. 8 indicates a voltage difference between the first and second pixel voltages in aspect of the embodiment and a voltage difference between the second pixel electrode and the second common electrode in aspect of the related art.

Referring to FIG. 8, it is shown that, at the voltage difference of about 5V, each of the related art LCD device and the LCD device of the embodiment has the highest transmissivity. However, the LCD device of the embodiment has the highest transmissivity of about 0.24 while the related art LCD device has the highest transmissivity of about 0.19. That is, the highest transmissivity of the LCD device of the embodiment is about 1.26 times the highest transmissivity of the related art LCD device.

A narrow viewing angle mode of the LCD device 100 is performed by operating liquid crystal molecules of the liquid crystal layer 190 substantially according to an electric field induced between the common electrode 175 and the first or second pixel electrode 140 or 150. That is, the liquid crystal molecules are operated substantially by the electrical field in a vertical direction between the array substrate and the color filter substrate. Accordingly, gray levels of the pixel region P change according to electric fields between the common electrode 175 and the first or second pixel electrode 140 or 150.

In the narrow viewing angle mode, it is preferred that a difference between the first and second pixel voltages is about 0V to about 0.5V. Within this pixel voltage difference range, voltage distribution lines in the liquid crystal layer 190 are substantially parallel with the plane of the substrates 101 and 161. Further, in case that the voltage difference exists (i.e., over 0V), it is preferred that the first pixel voltage of the first pixel electrode 140, which is farther from the common electrode 175 than the second pixel electrode 150, is more than the second pixel voltage of the second pixel electrode 150.

Referring to FIG. 9, in the narrow viewing angle mode, both of the first and second pixel voltages may periodically change in polarity with respect to the common voltage. For example, both of the first and second pixel voltages alternate between positive and negative polarities per frame. In this case, the common voltage may be constant.

The curves of FIG. 10 are obtained at about an azimuth angle corresponding to a left or right side of the LCD device 100. A reference "voltage difference" of FIG. 10 indicates a difference between the common voltage and the first or second pixel voltage.

Referring to FIG. 10, the transmissivity of the LCD device 100 at a polar angle of about 0 degree to about 10 degrees is almost 0. In other words, in front of the LCD device, light is hardly seen. However, the transmissivity of the LCD device 100 at a polar angle of about 40 degrees becomes the highest.

As described above, the LCD device of the embodiment can be selectively driven in the wide viewing angle mode or the narrow viewing angle mode without using separate viewing angle pixel region. Therefore, not only when texts are displayed but also when color images are displayed, the viewing angle of the LCD device can be effectively controlled. Further, in the narrow viewing angle mode, brightness can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first gate line and a second gate line on a first substrate;
   a first data line and a second data line crossing the first and second gate lines to define a pixel region;
   a first thin film transistor connected to the first gate line and the first data line;
   a second thin film transistor connected to the first gate line and the second data line;
   a first pixel electrode in the pixel region, the first pixel electrode being connected to the first thin film transistor and including at least one opening therein;
   a second pixel electrode in the pixel region, the second pixel electrode being connected to the second thin film transistor and including at least one opening therein;
   a common electrode on a second substrate;
   a liquid crystal layer between the second pixel electrode and the common electrode;
   a third data line crossing the first and second gate lines to define another pixel region along with the second data line;
   a third thin film transistor in the another pixel region and connected to the second gate line and the second data line;
   a fourth thin film transistor in the another pixel region, the fourth thin film transistor being connected to the second gate line and the third data line; and
   one of red, green, and blue color filter patterns between the second substrate and the common electrode and corresponding to the pixel region,
   wherein the at least one opening of the first pixel electrode does not overlap the at least one opening of the second pixel electrode.

2. The device according to claim 1, further comprising:
   a gate insulating layer on the first and second gate lines;
   a passivation layer on the first pixel electrode and including a drain contact hole exposing a drain electrode of the second thin film transistor.

3. The device according to claim 2, wherein the first pixel electrode is on the gate insulating layer, and the second pixel electrode is on the passivation layer and contacts the drain electrode through the drain contact hole.

4. The device according to claim 1, further comprising:
   a black matrix between the second substrate and the common electrode and corresponding to at least one of the first and second gate lines, the first and second data lines, and the first and second thin film transistors,
   wherein the others of the red, green, and blue color filter patterns correspond to two pixel regions adjacent to the pixel region, respectively.

5. The device according to claim 1, wherein the opening is bent and symmetrical with respect to a center portion thereof, and the first and second data lines are bent in parallel with the opening.

6. A method of driving the liquid crystal display device according to the claim 1, the method comprising:
   applying first and second pixel voltages to the first and second pixel electrodes, respectively, and applying a common voltage between the first and second pixel voltages to the common electrode, thereby operating the liquid crystal display device in a wide viewing angle mode.

7. The method according to claim 6, wherein the common voltage is substantially middle between the first and second pixel voltages.

8. The method according to claim 6, wherein the first and second pixel voltages are opposite and change per frame in polarity with respect to the common voltage.

9. A method of driving the liquid crystal display device according to claim 1, the method comprising:
   applying the first and second pixel voltages, a difference of which is about 0V to about 0.5V, to the first and second pixel electrodes, respectively, and applying a common voltage to the common electrode, thereby operating the liquid crystal display device in a narrow viewing angle mode.

10. The method according to claim 9, wherein the first and second pixel voltages change per frame in polarity with respect to the common voltage.

* * * * *